Nov. 27, 1951     H. D. FLORA     2,576,292
ROLL FOR CORN PICKERS
Filed April 28, 1947
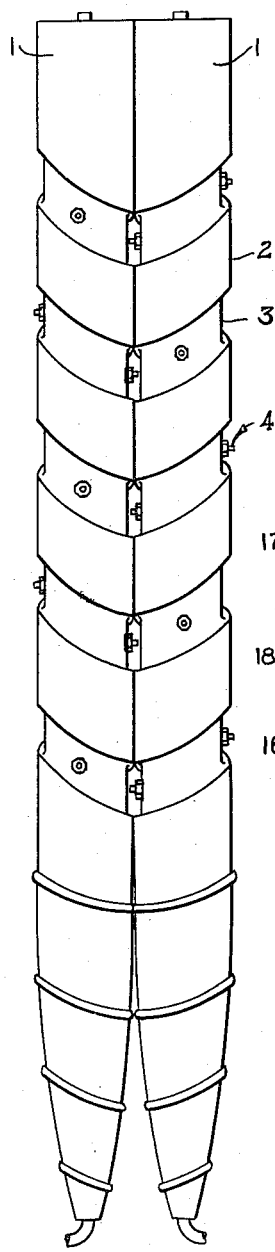
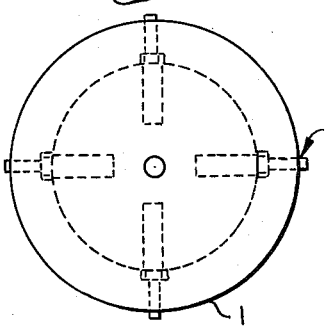
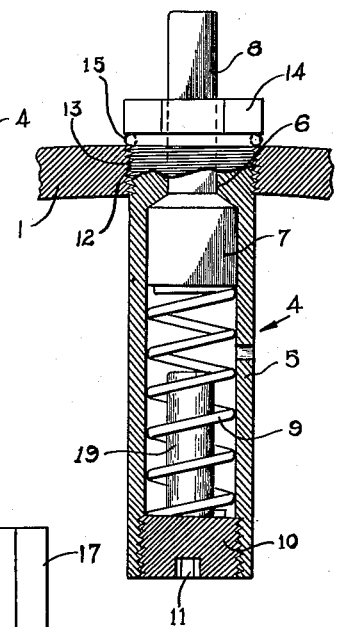
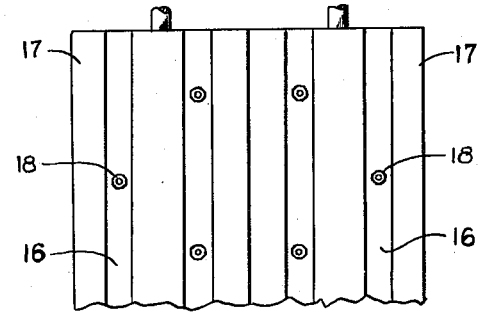
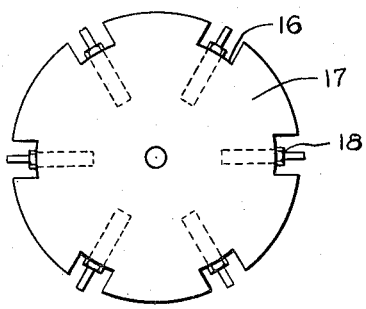
INVENTOR.
Herman D. Flora
BY
W. P. Hahn
ATTORNEY.

Patented Nov. 27, 1951

2,576,292

UNITED STATES PATENT OFFICE 2,576,292

ROLL FOR CORN PICKERS

Herman D. Flora, Cutler, Ind.

Application April 28, 1947, Serial No. 744,377

1 Claim. (Cl. 130—5)

The present invention relates to improvements in corn harvesting machines and has particular reference to improvements in the means used on such machines for removing the ears of corn from the stalk and removing the husk from the ear.

It is generally the practice, in machines of this character, to provide what is called snapper rolls, arranged in pairs, and so disposed on the harvesting machine that the standing corn stalks are engaged between the rolls and as the pair of rolls rotate, the ears on the corn stalks are snapped off of the stalks and deposited on a travelling conveyor of some character, which feeds them to what is known as a husker roll, which generally comprises a pair of rolls between which the ears are rotated. These husker rolls are provided with pins which engage the corn husks, tearing the same from the ear and leaving the ear stripped of the husk.

It is one of the objects of my invention to provide an improved pin or finger structure adapted to be used in connection with either of the above identified rolls and which, while assisting in removing the husk from the ear, will not damage the corn.

Another object of my invention is to provide a pin of the above character which, while being operable for the purposes described, will be so mounted that in event the pin or pins engaged a hard obstruction, such for instance as the hard stalk of corn or other hard matter, will give to such an extent that the stalk or other matter may pass between the rolls without tending to clog the same and which will not be damaged or cause damage to the rolls.

For the purpose of disclosing my invention, I have illustrated embodiments thereof in the accompanying drawings, in which:

Fig. 1 is a plan view of a pair of snapper rolls for corn harvesting machines having embodied therein my improved pin structure;

Fig. 2 is an end elevation, looking at the rear, of one of the rolls illustrated in Fig. 1;

Fig. 3 is a longitudinal detail sectional view, showing more particularly the construction of my pin and the manner of mounting the same in the roll;

Fig. 4 is a detail plan view of a pair of husker rolls; and

Fig. 5 is an end elevation of one of said rolls.

In the embodiment of my invention illustrated in Figs. 1 and 2, the snapper rolls 1 are of the usual construction, being adapted to rotate adjacent one another and being adapted to receive between the same the corn stalks. It is to be noted that the opposite ends of the snapper rolls are tapered so that they diverge from one another to provide an entry throat for the corn stalks. These rolls are provided around their peripheries with annular ribs 2 between which are arranged recesses 3. The rolls are generally comprised of hollow shells, the walls of which are fairly thick. In the groove 3, I arrange a series of fingers 4 which, as the rolls rotate, will tend to engage the corn ears, on the stalk, and help snap the ear from the corn stalk. As illustrated in Fig. 3, these pins preferably comprise a hollow cylindrical housing 5 having its upper end closed and provided with a center opening 6. Operating within this housing is a plunger 7 having its upper end reduced in diameter to provide a round finger 8, which extends through the top of the housing 5. Due to the enlarged diameter of the plunger 7, the outward movement of the finger 8 is limited. The plunger 7 is resiliently biased in its projected position through the medium of a coiled spring 9 interposed between the bottom of the plunger 7 and a closure plug 10 screw-threaded into the bottom end of the housing 5. This plug 10 is provided with a counter-sunk irregular opening 11 to receive a suitable wrench to enable the plug to be rotated. Preferably, the recess is of such a shape as to receive what is commercially known as an Allen wrench. The housing 5, at least at its upper end, is exteriorly screw-threaded, as at 12, to permit the same to be threaded into a receiving opening 13 in the shell of the snapper roll 1. The upper end of the housing is preferably formed with flattened sides, as at 14, to provide a nut or cap by which the same may be screwed tightly into its socket and this portion of the housing is sufficiently large to overlap the outer surface of the shell, a preferably resilient lock-washer 15 being interposed between the nut and the surface of the shell to absorb a certain amount of the jar imposed on the structure during operation and also to assist in locking the housing in its position. The tension of the spring 9 may of course, be varied to obtain the desired pressure upon the pin structure 8 by adjusting the threaded plug 10.

In actual practice, I have found it desirable to make the pin 8 cylindrical in cross section and of such a diameter that it will not penetrate between the rows of kernels of the corn. In actual practice, I have found that a pin of about one-fourth of an inch in diameter produces satisfactory results. A pin of this size has sufficient diameter to prevent it from entering between the rows of kernels and, at the same time, is small enough to provide a stripping action on the corn husks.

In the structure illustrated, in Figs. 4 and 5, I have shown this same pin structure as being applied to the husking rolls of a corn harvesting machine. In practice, the recesses or grooves 16 in the husking rolls 17 extend longitudinally of the rolls and the pins 18, corresponding in structure to the pins illustrated in Fig. 3, are fastened into the shell of the rolls in the recesses 16. Preferably, I stagger the pins in the different rows of recesses. As the rolls rotate with the corn ears being fed between the same, the resilient pins will engage the husk, tearing the same from the ear. It is to be noted that with the pins mounted in the manner illustrated, they extend radially of either the snapper rolls or the husker rolls and as the rolls rotate engage the corn husks assisting in drawing the corn into the rolls, at the same time assisting in removing the husks. Furthermore, due to the projection 19 on the plug 10 the fingers 8 cannot move inwardly below the top of the nut 14. This prevents the wedging of foreign matter in the opening, when the pin is retracted, to prevent the outward movement of the finger.

I claim as my invention:

In combination, a hollow cylindrical corn harvester snapper roll having a plurality of circular internally screw threaded stripper finger receiving openings in the wall thereof, a stripper finger unit inserted in each of said openings from the outer periphery and comprising a cylindrical casing having an external diameter not greater throughout its insertable length than said finger unit receiving opening in the roll and having a central passage extending therethrough, one portion of said passage being reduced in diameter to provide an integral internal shoulder, a piston operating within said central passage and restrained from projection out of said cylindrical casing by said shoulder, a flat topped stripper finger integral with said piston and projecting through the restricted portion of said passage, a nut shaped portion on the outer end of said cylindrical casing of greater diameter than the opening in the wall of said snapper roll, a coiled spring within the cylindrical casing for biasing said piston in its projected portion, and a plug threaded into the opposite end of said opening engaging one end of said spring and adjustable for adjusting the tension of said spring, said cylindrical casing being screw threaded for at least a portion below the nut-shaped portion for engagement with the internal threads of said finger openings in the roll.

HERMAN D. FLORA.

REFERENCES CITED

The following references are of record in the file of this patent:

UNITED STATES PATENTS

| Number | Name | Date |
|---|---|---|
| 230,113 | Curran | July 20, 1880 |
| 613,249 | Creider | Nov. 1, 1898 |
| 857,565 | Metcalf | June 18, 1907 |
| 941,782 | Hubbard | Nov. 30, 1909 |
| 970,610 | Crum | Sept. 20, 1910 |
| 1,202,801 | Carter | Oct. 31, 1916 |
| 1,274,432 | Mickelson | Aug. 6, 1918 |
| 1,663,843 | Imig | Mar. 27, 1928 |
| 1,795,476 | Coar I | Mar. 10, 1931 |
| 2,503,344 | Martin | Apr. 11, 1950 |